P. T. HANDIGES.
FORGED STEEL FULCRUM FOR BRAKE BEAMS.
APPLICATION FILED MAR. 1, 1910.

980,517.

Patented Jan. 3, 1911.

3 SHEETS—SHEET 1.

WITNESSES
T. L. Mochisee
H. H. Byrne

INVENTOR
Philip T. Handiges
by Knight Bros.
Att'ys.

P. T. HANDIGES.
FORGED STEEL FULCRUM FOR BRAKE BEAMS.
APPLICATION FILED MAR. 1, 1910.

980,517.

Patented Jan. 3, 1911.

3 SHEETS—SHEET 2.

WITNESSES

INVENTOR
Philip T. Handiges
by
Knight Bro. Attorneys

P. T. HANDIGES.
FORGED STEEL FULCRUM FOR BRAKE BEAMS.
APPLICATION FILED MAR. 1, 1910.

980,517.

Patented Jan. 3, 1911.

3 SHEETS—SHEET 3.

WITNESSES
T. L. Mockabee
H. H. Byrne

INVENTOR
Philip T. Handiges
by Knight Bros.
Attorneys

UNITED STATES PATENT OFFICE.

PHILIP T. HANDIGES, OF CLEVELAND, OHIO, ASSIGNOR TO THE DAMASCUS BRAKE BEAM CO., OF CLEVELAND, OHIO, A CORPORATION OF OHIO.

FORGED-STEEL FULCRUM FOR BRAKE-BEAMS.

980,517.  Specification of Letters Patent.  Patented Jan. 3, 1911.

Application filed March 1, 1910. Serial No. 546,666.

*To all whom it may concern:*

Be it known that I, PHILIP T. HANDIGES, a citizen of the United States, residing at Cleveland, in the county of Cuyahoga and State of Ohio, have invented certain new and useful Improvements in Forged-Steel Fulcrums for Brake-Beams, of which the following is a specification.

The present invention has reference to fulcrums for trussed brake beams and the method for making the same, and has for its primary object to provide a fulcrum block of the forged metal type whose general structure will, with slight variations, adapt the part to the requirements of brake beams on different makes of cars; and which fulcrum is, during the process of forging, simultaneously shaped to afford to the member its maximum strength along those parts generally subjected to the greatest strain.

The invention further contemplates the idea of constructing a fulcrum or strut which is self attaching in the sense that it may be readily applied to and fixed in position upon the compression and tension members of a brake beam with those parts already set up, and which in its manner of attachment to the compression member does not require the perforation or other weakening of said compression member.

In the accompanying drawings which illustrate the invention in its preferred embodiments:

Figures 1 to 6 are side elevations of divers structures of the fulcrum constructed in two part forgings, the respective compression and tension members therefor being shown in section. Figs. 7 to 12 are top plan views of Figs. 1 to 6 respectively. Figs. 13 to 18 disclose, in side elevation, the fulcrum or strut constructed of a single forging. Figs. 19 to 24 are the respective top plan views of Figs. 13 to 18, and; Figs. 25 to 29 illustrate the various stages of the fulcrum sections during the process of manufacture.

Figure 1:
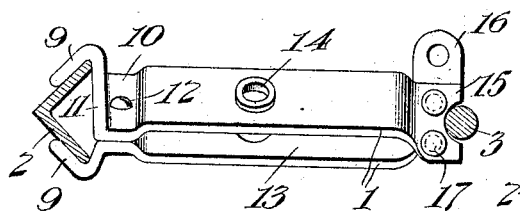
Figure 7:
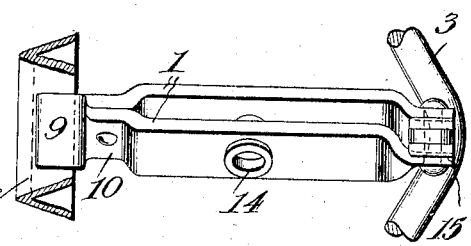
Figure 2:
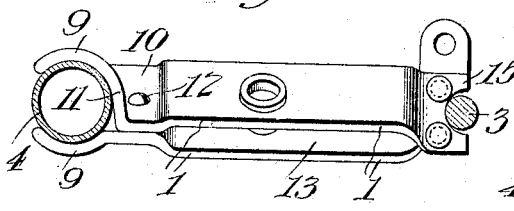
Figure 8:
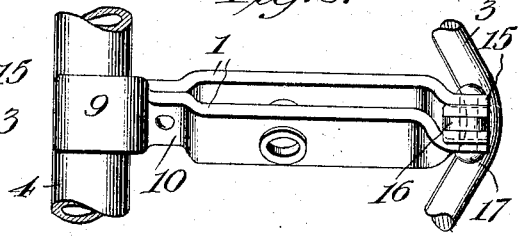
Figure 3:
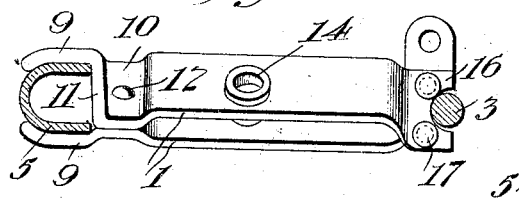
Figure 9:
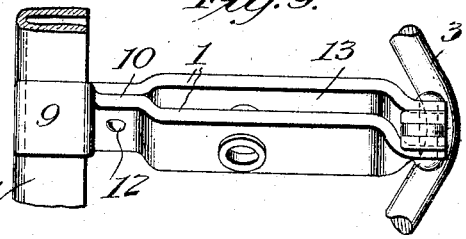
Figure 4:
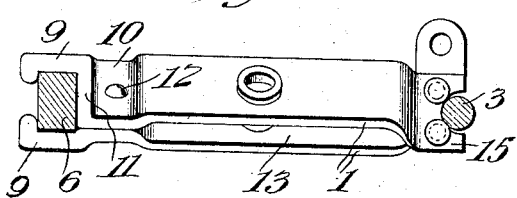
Figure 10:
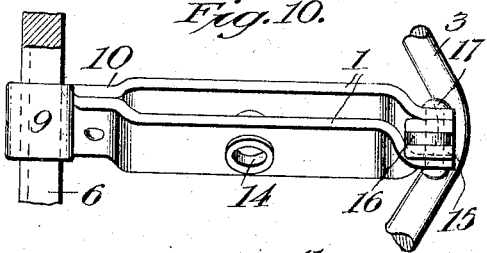
Figure 5:
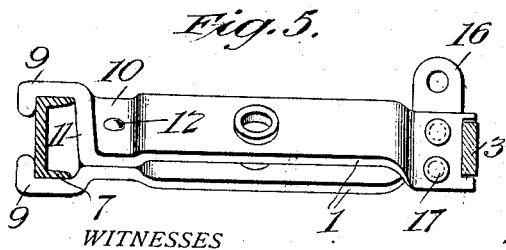
Figure 11:
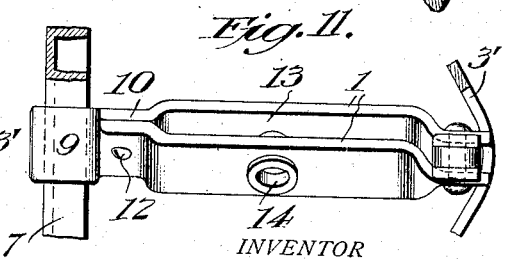
Figure 6:
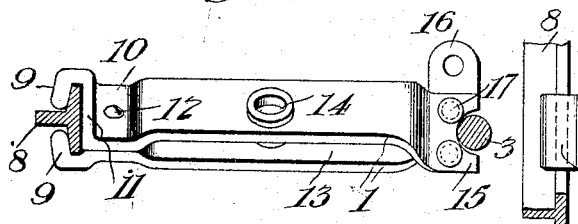
Figure 12:
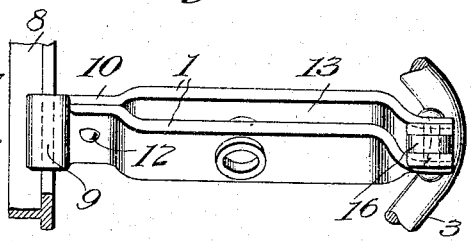
Figure 13:
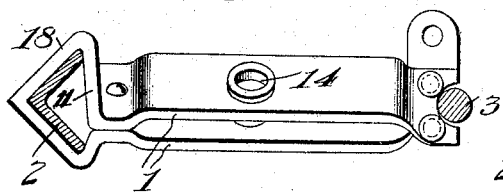
Figure 19:
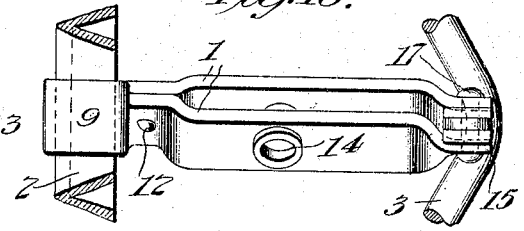
Figure 14:
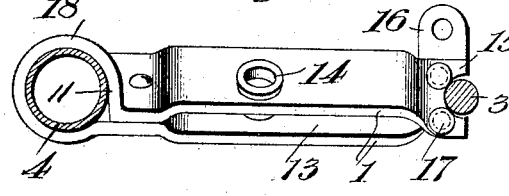
Figure 20:
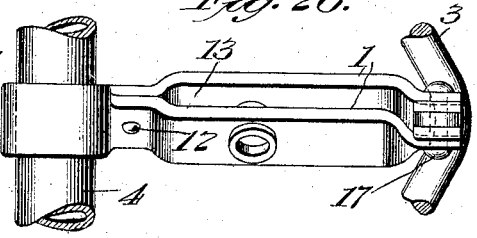
Figure 15:
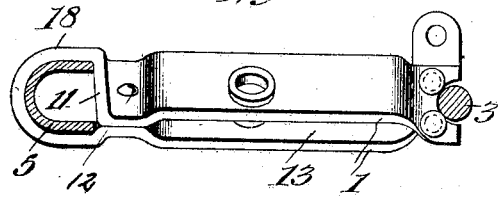
Figure 21:
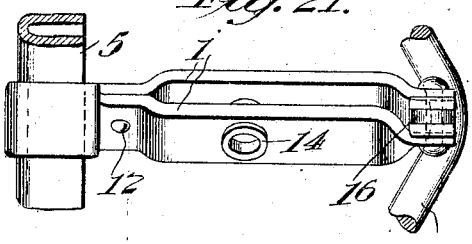
Figure 16:
Figure 22:
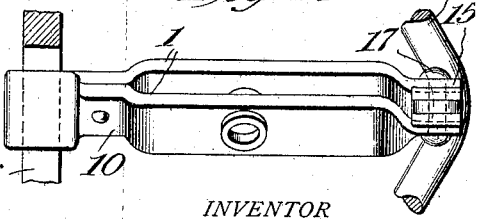
Figure 17:
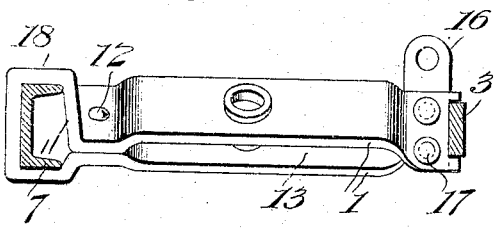
Figure 23:
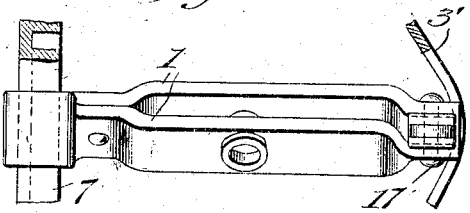
Figure 18:
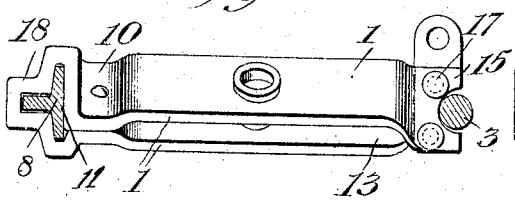
Figure 24:
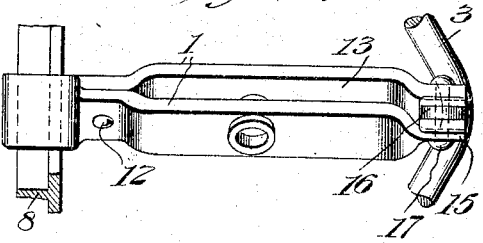
Figure 25:
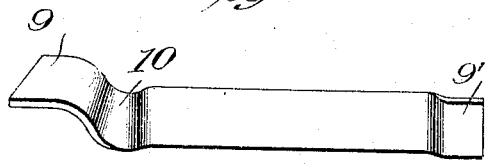
Figure 27:
Figure 26:
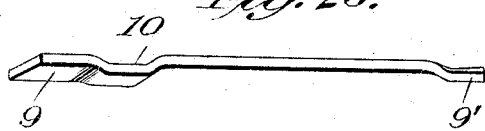
Figure 28:
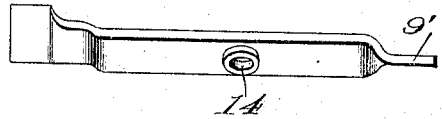
Figure 29:
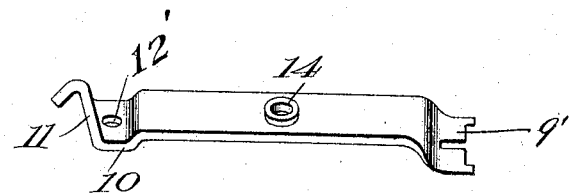

In the several arrangements shown in Figs. 1 to 12 the strut consists of a two part forging both members whereof are essentially of the same construction throughout, differing only in their peculiar design and manner of securement to their respective compression and tension members. The said latter parts are of the various types shown, viz. in Fig. 1 the compression member 2 is of angle iron or V-shape construction. In Fig. 2 the compression member 4 is of round tubular structure, and in Fig. 3 the corresponding member 5 is of U-shape in cross section. In Figs. 4 and 5 these parts 6 and 7 respectively are of solid bar and U design; and in Fig. 6 a T-beam 8 is employed as the compression member. In these several figures excepting Fig. 5, the usual tension rod 3 is used, and in Fig. 5 a strap 3′ constitutes the tensioning means. The parts 1 comprising the strut are arranged in parallel relation and are formed on one end with opposed gripping jaws 9 which conform to and embrace a section of the compression member of the brake beam. That portion of each fulcrum member adjacent to said gripping jaws has a reëntrant and diagonally disposed depression 10 which latter elements in coöperation provide faces or walls 11 that lie immediately against the front face of the compression member and in that relation said depressed portions 10, are through the medium of rivets 12, torsionally deflected to cause each of the strut member faces 11 to extend substantially across the front of the compression member; and with having said faces slightly inclined said gripping jaws 9 are caused to bind upon the compression member. The body portion of the fulcrum has its members spaced apart or expanded, as indicated in the several views, whereby to provide a slot or clearance 13 for the brake lever, and said spread out portions of the strut are also torsionally deflected so as to dispose the said slot at an angle to the dividing plane of the jaws. The expanded parts of said fulcrum are each provided with an apertured bearing 14 to provide suitable bearings for the pivot of the braking lever. The projecting or bearing portions of the apertures 14 are formed from the metal struck therefrom during the perforation of the openings, as will be explained hereinafter. The fore end of the fulcrum or that part which connects with the tension member of the brake beam is in like manner deflected to bring the members of the strut normal to the tension member and the space between the said distorted ends receives the spacing member 16 which part is secured therein by the rivets 17. The end of the strut members and the spacing block are suitably cut away to provide a bearing or seat for the tensioning member of the brake beam. In connection with the spacing piece 16 it is here to be noted that that portion is not a saddle for and does not support the tension member after the usual manner, but instead, the said tension member is supported directly by the strut as in the manner shown.

Referring to the arrangements shown in Figs. 13 to 24, the strut member in each form therein comprises a single forging doubled upon itself to provide the two members of the fulcrum, and the eye 18 which completely surrounds a section of the compression member. In all other respects the structure of the strut and its peculiar manner of attachment to the compression and tension members is identical with that disclosed in the corresponding views in Figs. 1 to 12.

Figs. 25 to 29 disclose the various shapes assumed by the fulcrum parts during the manufacture thereof, and as shown the design selected for illustration herein is that type of strut illustrated in Figs. 1 to 12. In these several stages the members are first, during the process of forging, given that shape shown in Figs. 25 and 26 wherein the reëntrant depression 10' and the gripping jaw 9 are given their initial formation, and also, during this operation, the opposite end 9' of the bar is given its initial formation. In the step following the aforesaid shaped parts are given that formation shown in Figs. 27 and 28, wherein said parts are shaped to their true design and proper proportions. In this latter operation the member is perforated and the portion 14 struck-up therefrom provides the bearing for the fulcrum lever. In the final step the reëntrant depression is perforated as at 12' to accommodate the rivet 12; and the tension rod engaging portion 9' is cut away to provide a suitable bearing therefor.

Having thus described my invention, what I claim as new therein and desire to secure by Letters Patent is:—

1. A fulcrum or strut for brake-beams comprising a two part forging having its end portions pinched and diagonally disposed, and the portion intermediate thereof spread apart or expanded, for the purpose set forth.

2. In a trussed brake-beam, a strut or fulcrum comprising a two part forging formed with gripping jaws adapted to conform to and embrace the compression member of the brake-beam, and having its portion adjacent said jaws pinched and disposed diagonally of the compression member, the opposite end of the fulcrum parts being pinched and providing a bearing for the tension member of the brake-beam; and that portion intermediate the pinched portions being expanded, for the purpose set forth.

3. In a trussed brake-beam, a strut or fulcrum comprising a forging formed with opposed gripping jaws conforming to the section of and embracing the compression member of the beam; also with reëntrant depressions immediately in front of the compression member, bringing said jaws together and providing faces on said members in abutment with the front face of the compression member; said reëntrant depressions being riveted together to firmly seat the jaws upon the compression member and torsionally deflected to cause each of the said strut member faces to extend substantially across the front of the compression member, and the forward end of the strut being constructed with a seat in which the tension member of the beam has bearing.

4. In a trussed brake beam, a self attaching strut or fulcrum comprising a two member forging having its members formed with opposed gripping jaws conforming to the section of and embracing the compression member of the beam; also with reëntrant depressions immediately in front of the compression member, bringing the strut members together and providing faces on said members in abutment with the front face of the compression member; said reëntrant depressions being riveted together to firmly seat the jaws upon the compression member and torsionally deflected to cause each of the said strut member faces to extend substantially across the front of the compression member, and the forward ends of the strut members being torsionally deflected relatively to the body portion and constructed with seats in which the tension member of the beam has bearing.

5. In a trussed brake-beam, a self attaching strut or fulcrum comprising a bar doubled upon itself to provide a two-member forging and having its members formed with opposed gripping jaws conforming to the section of and embracing the compression member of the beam; also with reëntrant depressions immediately in front of the compression member, bringing the strut members together and providing faces on said members in abutment with the front face of the compression member, said reëntrant depressions being riveted together to firmly seat the jaws upon the compression member and torsionally deflected to cause each of the strut member faces to extend substantially across the front of the compression member, and the forward ends of the strut members being torsionally deflected relatively to the body portion and constructed with seats in which the tension member of the beam has bearing.

6. In a trussed brake-beam, a self attaching strut or fulcrum comprising a bar doubled upon itself to provide a two-member forging and having its members formed with opposed gripping jaws conforming to the section of and embracing the compression member of the beam; also with reëntrant depressions immediately in front of the compression member, bringing the strut members together and providing faces on said members in abutment with the front face of the compression member; said reëntrant depressions being riveted together to firmly seat the jaws upon the compression member and torsionally deflected to cause each of the strut member faces to extend substantially across the front of the compression member and having said faces slightly inclined to cause the gripping jaws to bind upon the compression member; and the forward ends of the strut members being torsionally deflected relatively to the body portion to bring said ends normal to the tension member of the truss and provided with and firmly connected through a spacing member, and said ends being constructed with seats in which the tension member of the beam bears without contact with the spacing member.

7. In a trussed brake-beam, a self attaching strut or fulcrum comprising a bar doubled upon itself to provide a two-member forging and having its members formed with opposed gripping jaws conforming to the section of and embracing the compression member of the beam; also with reëntrant depressions immediately in front of the compression member, bringing the strut members together and providing faces on said members in abutment with the front face of the compression member; said reëntrant depressions being riveted together to firmly seat the jaws upon the compression member and torsionally deflected to cause each of the strut member faces to extend substantially across the front of the compression member and having said faces slightly inclined to cause the gripping jaws to bind upon the compression member; the body portions of said strut members being spaced apart to provide a fulcrum slot for a brake lever and torsionally deflected to present the slot at an angle to the dividing plane of the jaws; and the forward ends of the strut members being torsionally deflected relatively to the body portion to bring said ends normally to the tension member of the truss, and provided with and firmly connected through a spacing member, and said ends being constructed with seats in which the tension member of the beam bears without contact with the spacing member.

The foregoing specification signed at Cleveland, Ohio, this eighth day of February, 1910.

PHILIP T. HANDIGES.

In presence of—
G. W. CLEMMONS,
E. D. PUGH.